United States Patent
Tanaka et al.

(10) Patent No.: US 10,654,410 B2
(45) Date of Patent: May 19, 2020

(54) IN-VEHICLE LIGHTING DEVICE

(71) Applicant: TOYOTA JIDOSHA KABUSHIKI KAISHA, Toyota-shi, Aichi-ken (JP)

(72) Inventors: Masahiro Tanaka, Toyota (JP); Akimitsu Umekawa, Kuwana (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/118,003

(22) Filed: Aug. 30, 2018

(65) Prior Publication Data
US 2019/0126817 A1 May 2, 2019

(30) Foreign Application Priority Data

Oct. 31, 2017 (JP) ................................. 2017-210215

(51) Int. Cl.
*B60Q 3/20* (2017.01)
*B60Q 3/60* (2017.01)
*H01H 13/02* (2006.01)
*B60K 37/06* (2006.01)
*B60K 35/00* (2006.01)
*G05G 1/02* (2006.01)

(52) U.S. Cl.
CPC ................ *B60Q 3/20* (2017.02); *B60K 35/00* (2013.01); *B60K 37/06* (2013.01); *B60Q 3/60* (2017.02); *H01H 13/023* (2013.01); *B60K 2350/1024* (2013.01); *B60K 2370/143* (2019.05); *B60K 2370/336* (2019.05); *B60K 2370/34* (2019.05); *B60K 2370/345* (2019.05); *B60K 2370/691* (2019.05); *G05G 1/02* (2013.01); *H01H 2231/026* (2013.01)

(58) Field of Classification Search
CPC .. B60Q 3/20; B60Q 3/60; B60K 37/06; F21V 8/00; G02B 6/00; H01H 25/00; H01H 25/04
See application file for complete search history.

(56) References Cited

U.S. PATENT DOCUMENTS 2,114,067 A * 4/1938 Mitchell ................ B60K 37/06
116/246
3,267,244 A * 8/1966 Schultz ................ H01H 13/023
200/314

(Continued)

FOREIGN PATENT DOCUMENTS

JP 2010114010 A 5/2010

*Primary Examiner* — Anabel Ton
(74) *Attorney, Agent, or Firm* — Hunton Andrews Kurth LLP

(57) ABSTRACT

An in-vehicle lighting device includes: a panel that has a front surface and a back surface, and has a through-hole penetrating through the front surface and the back surface; a light source disposed on a side of the back surface of the panel; and a button inserted in the through-hole, the button including a front end part protruding from the front surface, an first intermediate part provided continuously with the front end part and located between the front surface and the back surface of the panel, a surface of the first intermediate part containing a material that reflects light emitted from the light source, and a back end part provided continuously with the first intermediate part and protrudes from the back surface.

8 Claims, 4 Drawing Sheets

(56) References Cited

U.S. PATENT DOCUMENTS

| | | | |
|---|---|---|---|
| 2007/0045093 A1* | 3/2007 | Katsumoto | H01H 13/023 200/314 |
| 2008/0001549 A1* | 1/2008 | Altonen | G02B 6/0001 315/250 |
| 2015/0138801 A1* | 5/2015 | Salter | B60Q 3/54 362/510 |

* cited by examiner

IN-VEHICLE LIGHTING DEVICE

INCORPORATION BY REFERENCE

The disclosure of Japanese Patent Application No. 2017-210215 filed on Oct. 31, 2017 including the specification, drawings and abstract is incorporated herein by reference in its entirety.

BACKGROUND

1. Technical Field

The present disclosure relates to an in-vehicle lighting device.

2. Description of Related Art

Japanese Patent Application Publication No. 2010-114010 describes a lighting structure of a mobile device for lighting a slight clearance 8 between a navigation key 6 that is provided in an operation layer 5 of a mobile phone 1 and a select key 7 that is pressably fitted inside the navigation key 6 with the clearance 8 left therebetween and faces a pressure-sensitive switch 10 so as to be able to come in contact with and separate from the pressure-sensitive switch 10. This lighting structure includes an LED 20 built inside a casing 2 of the mobile phone 1, and a light-transmissive light guide layer 30 that guides a ray of light from the LED 20 to the clearance 8.

SUMMARY

Reducing the size of a button to be pressed by an operator may result in a failure to secure a sufficient amount of light to make the button visible. However, increasing the clearance around the button to secure the amount of light would impair the aesthetic quality.

In particular, in the case of an in-vehicle lighting device, such an amount of light as to make a button sufficiently visible is required during nighttime driving to secure safety. However, if the clearance around the button is increased to secure the amount of light, this clearance becomes obtrusive during daytime, impairing the aesthetic quality.

Therefore, the present disclosure provides an in-vehicle lighting device that secures both aesthetic quality and visibility.

An in-vehicle lighting device according to an aspect of the disclosure includes: a panel that has a front surface and a back surface, and has a through-hole penetrating through the front surface and the back surface; a light source disposed on a side of the back surface of the panel; and a button inserted in the through-hole, the button including a front end part protruding from the front surface, an first intermediate part provided continuously with the front end part and located between the front surface and the back surface of the panel, a surface of the first intermediate part containing a material that reflects light emitted from the light source, and a back end part provided continuously with the first intermediate part and protrudes from the back surface.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1B:
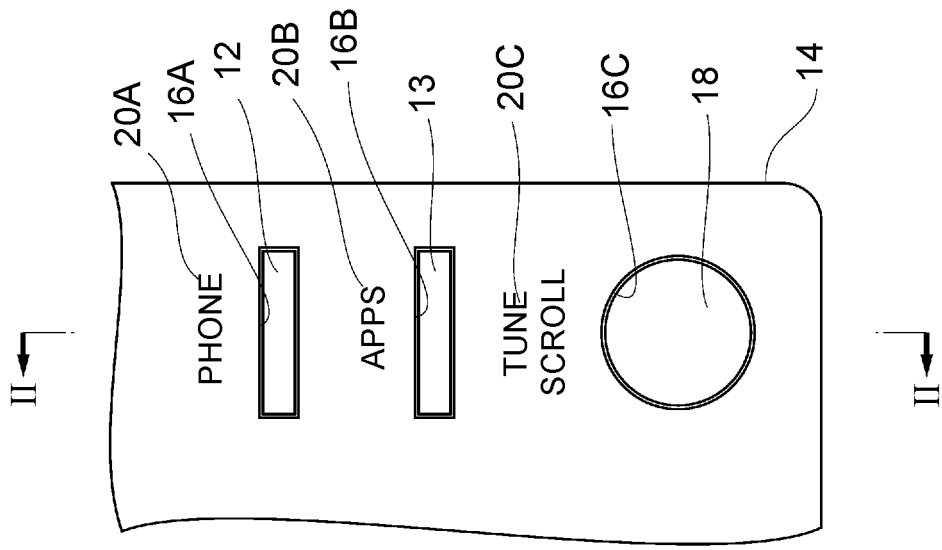
FIG. 1B is a partially enlarged view of the in-vehicle lighting device 10 according to the embodiment.
Figure 1A:
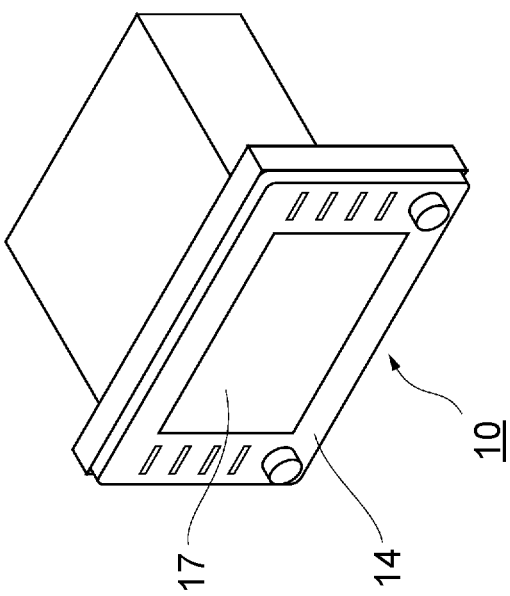
FIG. 1A is a perspective view of an in-vehicle lighting device 10 according to an embodiment.

FIG. 1A is a perspective view of an in-vehicle lighting device 10 according to an embodiment, and FIG. 1B is an enlarged front view of a button 12 (an example of the "button") and a button 13 (an example of the "button") of the in-vehicle lighting device 10.

As shown in FIG. 1A, the in-vehicle lighting device 10 includes a panel 14 (an example of the "panel") and a display 17 fitted in the panel 14, and can display an image based on a car navigation function, an audio function, etc. provided in the vehicle.

As shown in FIG. 1B, the panel 14 has a through-hole 16A (an example of the "through-hole"), a through-hole 16B (an example of the "through-hole"), and a through-hole 16C that penetrate through the panel 14, and the button 12, the button 13, and a dial knob 18 (an example of the "component") are inserted in the through-holes 16A, 16B, 16C, respectively.

Letters indicating the function of the button are written on an upper side of each button. In FIG. 1B, letters 20A that read "PHONE" are written above the button 12 close to the button 12, and letters 20B that read "APPS" are written above the button 13 close to the button 13. Moreover, letters 20C that read "TUNE SCROLL" are written above the dial knob 18 close to the dial knob 18. As shown in FIG. 1B, the button 12 and the button 13 each have a rectangular shape elongated in a horizontal direction as seen from a front side of the panel 14. The lengths of the button 12 and the button 13 in a vertical direction are about 0.5 mm, which is equivalent to the lengths of the letters 20A and the letters 20B in the vertical direction.

Figure 2:
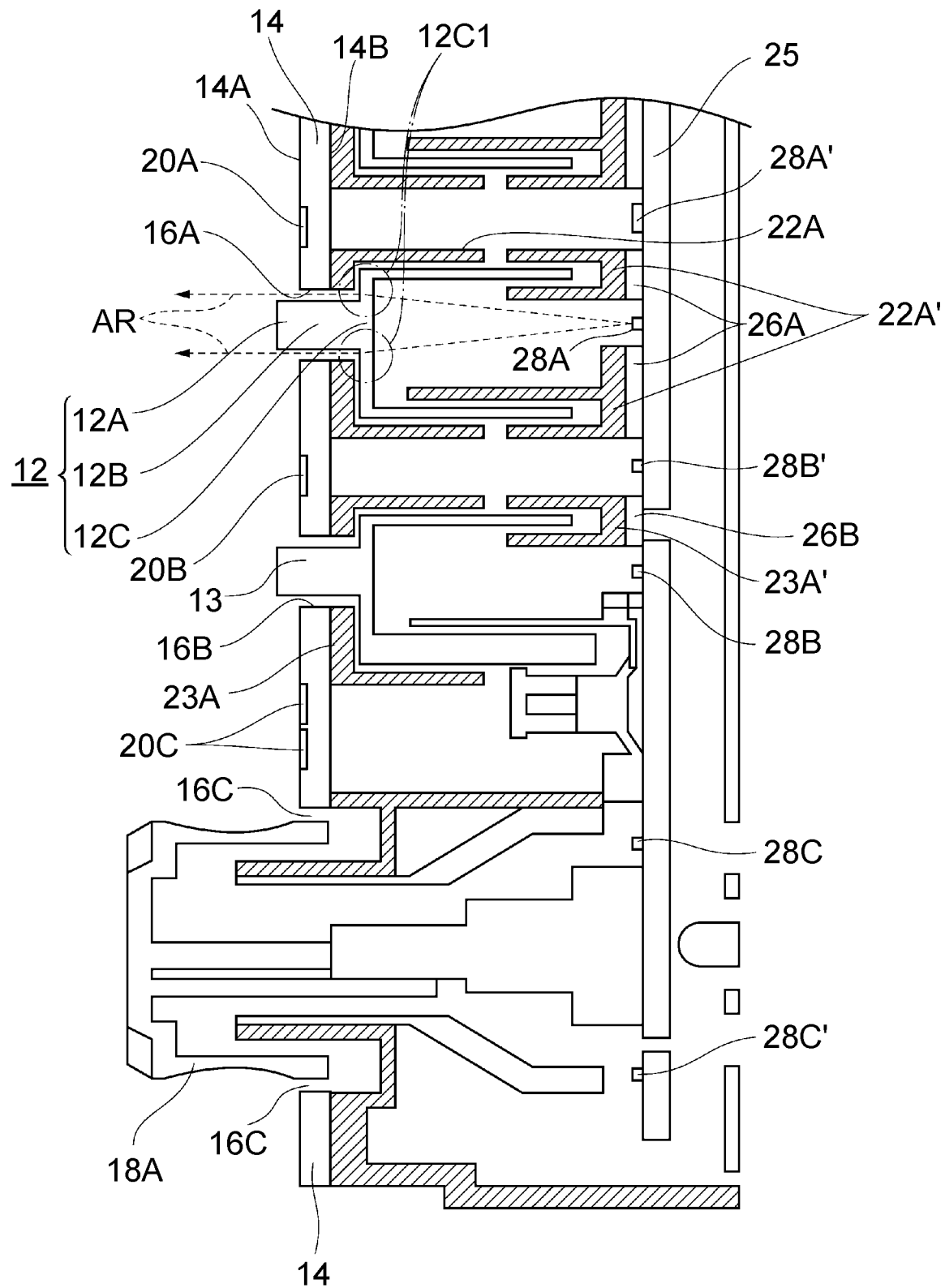
FIG. 2 is a sectional view taken along line II-II in FIG. 1B.

FIG. 2 is a sectional view taken along line II-II in FIG. 1B.

The button 12 includes: a front end part 12A protruding from a front surface 14A of the panel 14 (in other words, protrudes beyond the front surface 14A toward the opposite side from a back surface 14B); an intermediate part 12B that is provided integrally and continuously with the front end part 12A and located between the front surface 14A and the back surface 14B of the panel 14; and a back end part 12C that is provided integrally and continuously with the intermediate part 12B and protrudes from the back surface 14B of the panel 14 (in other words, protrudes beyond the back surface 14B toward the opposite side from the front surface 14A).

The front end part 12A and the intermediate part 12B have the same rectangular shape as seen from the front side of the panel 14. A portion of the back end part 12C connecting to the intermediate part 12B has the same rectangular shape as the intermediate part 12B, but the back end part 12C is expanded from that portion in a direction parallel to the back surface 14B of the panel 14 and then extended in a direction perpendicular to the back surface 14B of the panel 14 and away from the panel 14. The button 12 is configured to be movable in a direction perpendicular to the front surface 14A of the panel 14.

The button 12 is made of a milky-white resin that is injection molded. Among surfaces of the front end part 12A, a surface facing the same direction as the front surface 14A of the panel 14 (an example of the "front end surface") is coated with a black paint (an example of the "material that absorbs light"). On the other hand, a side surface of the front end part 12A (an example of the "front end side surface") perpendicular to this surface, a surface of the intermediate part 12B formed continuously with this side surface, and a part of a side surface of the back end part 12C are plated with metal (an example of the "material that reflects light"). The milky-white resin is exposed through the other surfaces of the button 12.

Since the back end part 12C is expanded in the direction parallel to the back surface 14B of the panel 14, the back end part 12C has a transmissive portion 12C1 (an example of the "transmissive portion") exposed to a clearance between the button 12 and the panel 14. Here, the button 12 and the through-hole 16A each have a rectangular shape as seen from the front side of the panel 14, and therefore the transmissive portion 12C1 that is exposed to a clearance between the button 12 and the through-hole 16A and faces this clearance has a hollow rectangular shape. The milky-white resin is exposed through a surface of the transmissive portion 12C1. The portion of the back end part 12C that is extended in the direction perpendicular to the back surface 14B of the panel 14 has a hollow rectangular shape.

A wiring substrate 25 that is fixed and supported parallel to the panel 14 is installed on the side of the back surface 14B of the panel 14. On a surface of the wiring substrate 25, a wiring pattern, a circuit element, etc. are provided to transmit a signal detecting an operator's pressing down the button 12 or the button 13 or turning the dial knob 18.

A part of a support member 22A is bonded to the back surface 14B of the panel 14, and the support member 22A is formed along a surface of the back end part 12C so as to support the button 12. A support member 22A' is fixed to the wiring substrate 25. As a counterpart to the support member 22A, the support member 22A' is formed along the surface of the back end part 12C so as to support the button 12 and regulate a movement direction of the button 12. The support member 22A and the support member 22A' face each other across a slight clearance. Surfaces of the support member 22A and the support member 22A' are painted black. Therefore, light in a region surrounded by the support member 22A and the support member 22A' does not easily leak out of this region.

As shown in FIG. 2, an end of the back end part 12C and the support member 22A' are installed so as to leave a clearance therebetween in the direction perpendicular to the back surface 14B of the panel 14. The end of the back end part 12C comes in contact with the support member 22A' when the front end part 12A of the button 12 is pressed down by the operator and moved to the position at which the intermediate part 12B has been present.

A sensor 26A is mounted on the wiring substrate 25. The sensor 26A is bonded to the support member 22A'. The sensor 26 is configured to be able to detect a stress occurring when the end of the back end part 12C comes in contact with the support member 22A' as the front end part 12A of the button 12 is pressed down by the operator and moved toward the intermediate part 12B.

An LED 28A serving as a light source is mounted on the wiring substrate 25. The LED 28A is installed in a region occupied by the front end part 12A of the button 12 as seen from the front side of the panel 14.

The letters 20A indicating the function of the button 12 are formed on the front surface 14A of the panel 14. An LED 28A' serving as a light source is mounted on the wiring substrate 25 in a region corresponding to where the letters 20A are formed as seen from the front side of the panel 14.

The button 13 has the same configuration or function as the button 12, and therefore the description thereof will be omitted. The letters 20B, support members 23A, 23A', and LEDs 28B, 28B' provided in association with the button 13 have the same configuration or function as the letters 20A, the support members 22A, 22A', and the LEDs 28A, 28A', respectively, and therefore the description thereof will be omitted.

The dial knob 18 has a cylindrical knob 18A provided so as to protrude from the front surface 14A of the panel 14, and is configured to be turnable around an axis of the cylindrical knob 18A. To allow the operator to turn the dial knob 18 by pinching the knob 18A between fingers, the length of the knob 18A in the vertical direction is set to be larger than the lengths of the button 12 and the button 13 in the vertical direction as seen from the front side of the panel 14. For the same reason, the dial knob 18 is installed such that the amount of protrusion of the knob 18A from the front surface 14A of the panel 14 becomes larger than the amounts of protrusion of the button 12 and the button 13 from the front surface 14A of the panel 14. A surface of the knob 18A is painted black. Thus, the surface of the knob 18A at a part between the front surface 14A and the back surface 14B of the panel 14 (an example of the "second intermediate part") is painted black.

The letters 20C indicating the function of the dial knob 18 are formed on the front surface 14A of the panel 14. LEDs 28C (an example of the "second light source"), 28C' (an example of the "second light source") serving as light sources are mounted on the wiring substrate 25 in a region corresponding to where the knob 18A is formed as seen from the front side of the panel 14. The dial knob 18 includes a part protruding from the back surface 14B (an example of the "second back end part"), and a sensor (not shown) that detects an amount of turning of the knob 18A is mounted on the wiring substrate 25.

Here, as shown in FIG. 2, a clearance is provided between the panel 14 and each of the button 12, the button 13, and the dial knob 18. However, the clearance between the panel 14 and the dial knob 18 is larger than the clearance between the panel 14 and each of the button 12 and the button 13.

Figure 3:
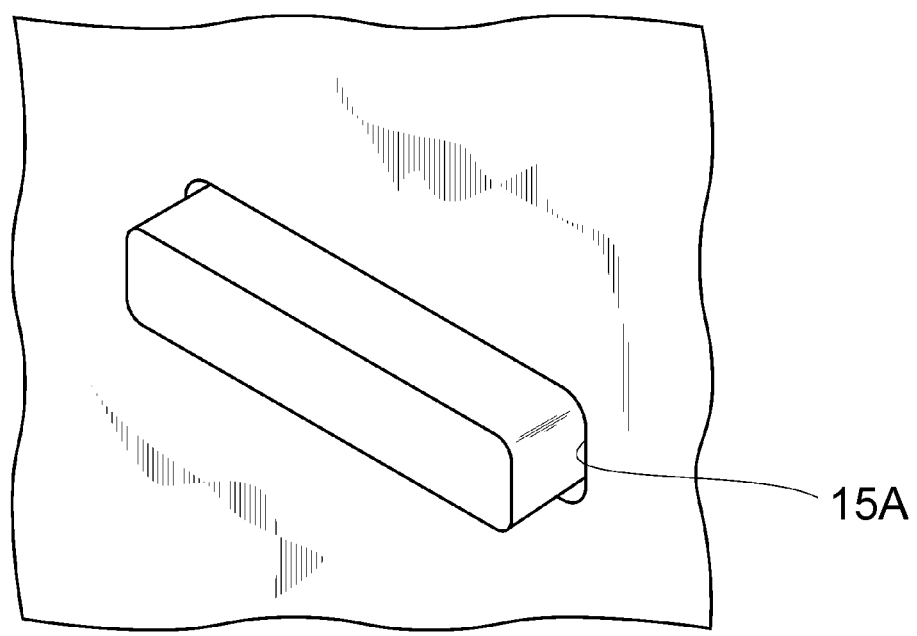
FIG. 3 is a perspective view of a button 15.

FIG. 3 is a perspective view of a button 15 having the same structure as the button 12 and the button 13. A side surface of a front end part 15A of the button 15 protruding from the front surface 14A of the panel 14 is plated with metal. A surface of an intermediate part of the button 15 located between the front surface 14A and the back surface 14B of the panel 14 is also plated with metal. On the other hand, a surface of the front end part 15A facing the front side of the panel 14 is coated with a black paint.

How the button 12, the button 13, and the dial knob 18 are lighted by light emitted from the light sources in the in-vehicle lighting device 10 thus configured will be described below.

For example, the LEDs 28A, 28A', 28B, 283, 28C, 28C' are configured to operate in conjunction with headlamps, etc. of an automobile in which the in-vehicle lighting device 10 is installed.

As shown in FIG. 2, light emitted from the LED 28A enters the button 12 from the back surface side of the back end part 12C through which the milky-white resin is exposed. As indicated by arrows AR, part of this light passes through the transmissive portion 12C1 and exits the button 12 and then passes through the clearance. Since the side surface of the front end part 12A, the surface of the intermediate part 12B formed continuously with this side surface, and a part of the side surface of the back end part 12C are plated with metal, this light is reflected by the metal plates in the process. Therefore, compared with the case where these surfaces are not plated with metal, the clearance corresponding to the outline of the button 12 looks like shining. In particular, since the milky-white resin is used as the material of the button 12, the light passing through the inside of the button 12 is scattered. As a result, a large amount of scattered light is reflected by the metal plates and contributes to making the clearance corresponding to the outline of the button 12 shine.

Figure 4:
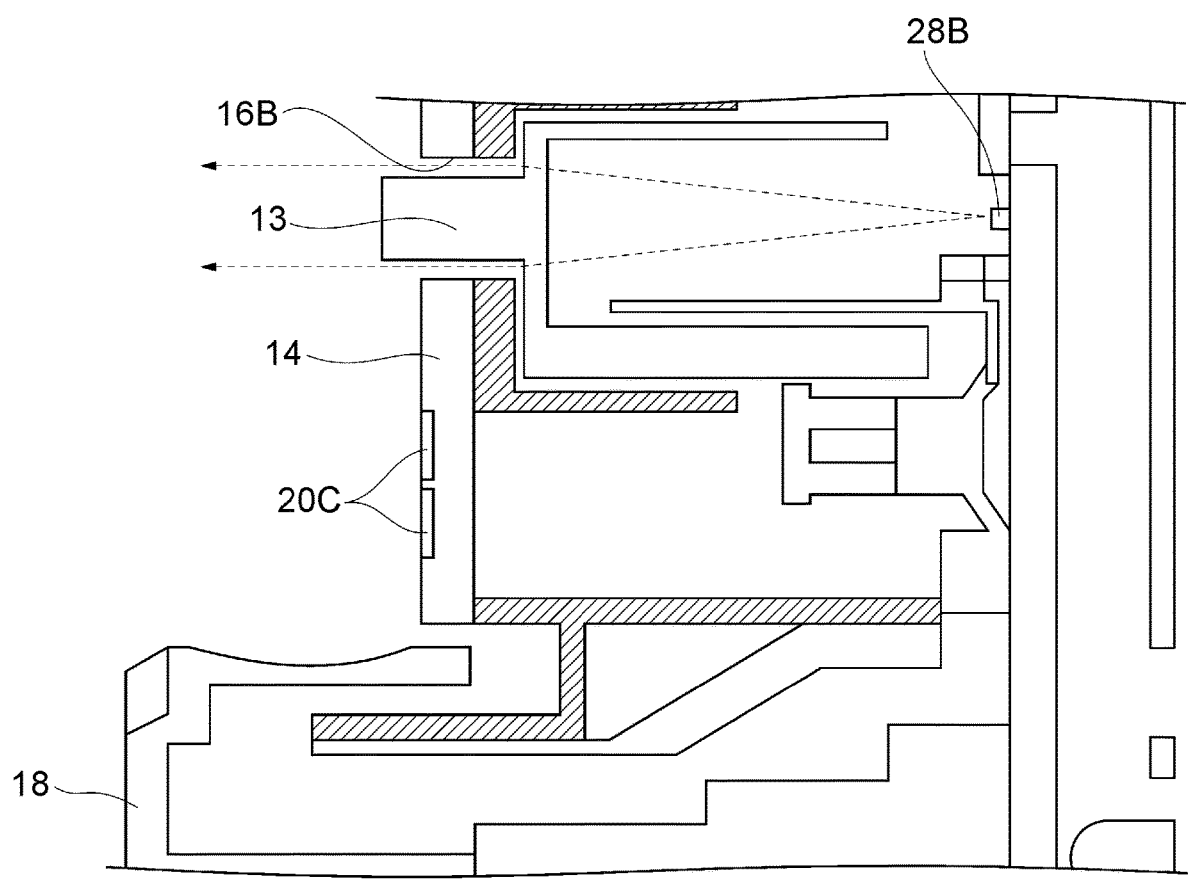
FIG. 4 is a view showing light that has been emitted from an LED 28B and passed through a clearance.

Similarly, FIG. 4 shows how light having passed through the clearance corresponding to the button 13 spreads.

On the other hand, the light having entered the button 12 reflects off the metal plates on the side surface of the front end part 12A, the surface of the intermediate part 12B formed continuously with this side surface, and a part of the side surface of the back end part 12C, and is thus kept from coming out of the button 12. Since the surface of the front end part 12A facing the front side is coated with a black paint, the light hardly comes out from this surface either.

Thus, the light passing through the inside of the button 12 and exiting from the surface of the front end part 12A can be reduced, so that the clearance corresponding to the outline of the button 12 can be made to shine conspicuously.

Since the surfaces of the support member 22A and the support member 22A' are coated with a black paint, the light having exited the button 12 can be kept from leaking from other part than the clearance.

The LED 28A is installed in the region occupied by the front end part 12A of the button 12 as seen from the front side of the panel 14. Therefore, as indicated by the arrows AR, the light emitted from the LED 28A enters the transmissive portion 12C1, without reflecting, in a direction substantially perpendicular to the surface of the transmissive portion 12C1, and travels from the surface of the transmissive portion 12C1 toward the clearance. Thus, loss due to absorption or reflection can be reduced.

The light emitted from the LED 28C and the LED 28C' travels through the clearance toward the front surface 14A of the panel 14 while reflecting off a back surface of the knob 18A, etc. However, the side surface of the knob 18A is coated with a black paint, which absorbs a relatively large amount of light compared with a metal plate. Therefore, the clearance around the dial knob 18 is set to be larger than the clearances around the button 12 and the button 13 in order to secure the visibility of the dial knob 18 equivalent to the visibility of the button 12 and the button 13. However, the clearance around the dial knob 18 is not conspicuous even during daytime, since the dial knob 18 is larger, and protrudes farther from the front surface 14A of the panel 14, than the button 12 and the button 13.

The light emitted from the LED 28A' and the light emitted from the LED 283 pass through the panel 14 and illuminate the letters 20A, 20B, respectively, so as to make these letters conspicuous. The amount of light from the LEDs 28A', 28B' is adjusted with the absorptance, thickness, etc. of the panel 14 taken into account such that the LEDs 28A', 28B' appropriately illuminate the letters 20A, 20B.

Like the light emitted from the LED 28A, the light emitted from the LED 28B makes the location of the button 12 visible by passing through the clearance and making the outline of the button 12 shine.

As has been described above, in the in-vehicle lighting device 10 according to this embodiment, even when the button 12 and the button 13 are so small that no letters can be indicated thereon in a visible size, the outlines of the button 12 and the button 13 can be made conspicuous by light passing through the clearances around the button 12 and the button 13 smaller than the clearance around the dial knob 18. Thus, an in-vehicle lighting device that secures both aesthetic quality and visibility can be provided.

A single LED may be used to light a plurality of buttons or both a button and letters.

The light source is not limited to an LED. However, an LED having high directionality is preferred.

Colors including white may be determined based on technical common sense, within a range determined by a measurement method specified by a standard, etc.

The button need not be movable. For example, a configuration may be adopted in which a sensor that detects pressing down of the button is provided on a back surface of the button.

The button may have various shapes. However, the effects of the present disclosure are exhibited more favorably when the button is so small that no letters can be indicated on a surface thereof in a visible size.

While the dial knob has been described as an example of the component, the component may instead be a large button, etc. as long as the component is to be operated by an operator.

Other than metal plating, a treatment that can achieve a predetermined degree of brilliance (e.g., a degree of brilliance of 50% as measured based on a standard) may be performed, for example, according to the wavelength of light emitted from a light source. For example, a paint that reflects light emitted from a light source may be applied.

The front end surface of the front end part need not be coated with a black paint. For example, plating the front end surface with metal can also keep light passing through the inside of the button from leaking out.

Metal plating, etc. may be performed on only the surface of the intermediate part.

The surface of the panel facing the surface of the intermediate part may also be made of a material that reflects light.

Various modifications can be made to the present disclosure within the scope of ordinary creative capabilities of those skilled in the art, as long as such modifications do not constitute a departure from the gist of the disclosure.

What is claimed is:

1. An in-vehicle lighting device comprising:
   a panel that has a front surface and a back surface, and has a through-hole penetrating through the front surface and the back surface;
   a light source disposed on a side of the back surface of the panel; and
   a button inserted in the through-hole, the button including
      a front end part protruding from the front surface,
      an first intermediate part provided continuously with the front end part and located between the front surface and the back surface of the panel, a surface of the first intermediate part containing a material that reflects light emitted from the light source, and
      a back end part provided continuously with the first intermediate part and protrudes from the back surface, wherein the light source is disposed such that the light emitted from the light source passes through a clearance between the panel and the button.

2. The in-vehicle lighting device according to claim 1, wherein
the back end part includes a transmissive portion made of a member that transmits light emitted from the light source, and the button is configured such that light emitted from the light source and having passed through the transmissive portion passes through a clearance between the first intermediate part and the panel.

3. The in-vehicle lighting device according to claim 2, wherein
the transmissive portion is provided at a position facing the clearance between the first intermediate part and the panel.

4. The in-vehicle lighting device according to claim 1, wherein:
the front end part includes a front end surface that faces a same direction as the front surface of the panel, and a front end side surface that connects the front end surface and the surface of the first intermediate part to each other;
the front end surface is made of a material that absorbs light emitted from the light source; and
the front end side surface is made of a material that reflects light emitted from the light source.

5. The in-vehicle lighting device according to claim 4, wherein
the front end surface and the front end side surface are perpendicular to each other.

6. The in-vehicle lighting device according to claim 1, wherein:
the front end part is configured to be movable in a direction from the front end part toward the first intermediate part; and
the front end part includes a sensor that is configured to detect contact of the back end part when the front end part moves toward the first intermediate part.

7. The in-vehicle lighting device according to claim 1, wherein:
the button is made of a white resin; and
the first intermediate part is made of the white resin and a material that is provided on a surface of the white resin and reflects light.

8. The in-vehicle lighting device according to claim 1, wherein:
the panel has a second through-hole penetrating through the front surface and the back surface; and
the in-vehicle lighting device further comprises a component inserted in the second through-hole, the component including:
a second front end part protruding farther than the front end part from the front surface of the panel;
a second intermediate part provided continuously with the second front end part and located between the front surface and the back surface of the panel;
a second back end part provided continuously with the second intermediate part and protruding from the back surface; and
a second light source disposed on the side of the back surface of the panel, wherein
a surface of the second intermediate part is made of a second material that absorbs light emitted from the light source, and
a clearance between the second intermediate part and the panel is larger than the clearance between the first intermediate part and the panel.

* * * * *